United States Patent [19]

Robbins, Jr. et al.

[11] 3,813,946

[45] June 4, 1974

[54] TEMPERATURE COMPENSATING CIRCUIT

[75] Inventors: Frederick L. Robbins, Jr., Tewksbury; Paul J. Suprenant, Chelmsford, both of Mass.

[73] Assignee: Raytheon Company, Lexington, Mass.

[22] Filed: Oct. 3, 1971

[21] Appl. No.: 195,351

[52] U.S. Cl. ................... 73/430, 73/497, 74/5.6
[51] Int. Cl. ............................................. G01d 11/12
[58] Field of Search .......... 74/5.6, 5.5; 73/497, 393, 73/430, 414, 178 R, 59

[56] References Cited
UNITED STATES PATENTS
2,837,913   6/1958   Rich et al. ........................... 73/59

*Primary Examiner*—Donald O. Woodiel
*Attorney, Agent, or Firm*—Richard M. Sharkansky; Joseph D. Pannone; Philip J. McFarland

[57] ABSTRACT

A temperature compensating circuit for use with a fluid damped measuring instrument is disclosed. Temperature variations of the viscous damping fluid used in the instrument produce changes in the dynamic response characteristic of the instrument. These changes are compensated by including in the temperature compensating circuit a temperature sensitive element, the electrical value of which varies in accordance with the temperature of the viscous damping fluid. The temperature compensating circuit is responsive to the signal produced at the output of the measuring instrument and the dynamic response characteristic of such circuit is a function of the electrical value of the temperature sensitive element. The dynamic response of the temperature compensating circuit varies with changes in temperature so that the characteristic of the signal produced at the output of such circuit in response to a parameter being measured by the measuring instrument is invariant with such changes in temperature.

4 Claims, 2 Drawing Figures

PATENTED JUN 4 1974  3,813,946

TEMPERATURE COMPENSATING CIRCUIT

The invention herein described was made in the course of or under a contract or subcontract thereunder, with the Department of Defense.

BACKGROUND OF THE INVENTION

This invention relates generally to temperature compensating circuitry and more particularly to temperature compensating circuitry for use in a fluid damped measuring instrument wherein the dynamic response characteristic of such instrument is dependent on the viscosity of the damping fluid.

As is known in the art, some types of measuring instruments, such as gyroscopic apparatus and accelerometers, may use fluid damping to prevent such instrument from having an undamped oscillatory dynamic response characteristic and thereby enable such instrument to reach a steady state condition in a reasonable time. As is also known, the damping produced by such fluid is proportional to the viscosity of the fluid; also, the viscosity of the fluid is dependent on its temperature. Consequently, the dynamic response characteristic of such instruments may vary with temperature from an overdamped response characteristic to an underdamped characteristic. In many applications, for example when used in missiles which are required to function over temperature ranges in the order of 100°F, such variation in dynamic response characteristic is intolerable. To avoid such variation, especially when the ambient temperature is low, thermostatically controlled heaters must be provided. Obviously, the use of such heaters in a missile reduces space allotment and increase the cost and weight of the missile.

SUMMARY OF THE INVENTION

With this background of the invention in mind it is, therefore, an object of the invention to provide compact temperature compensating apparatus for use with a fluid damped measuring instrument.

This and other objects of the invention are attained generally by an electronic circuit coupled to the output of the measuring instrument for producing an output signal in response to an input parameter being measured by the instrument, such circuit including a temperature sensitive element, the electrical value of such element varying in accordance with the temperature of the fluid to change the electrical characteristic of the circuit whereby the dynamic characteristic of the output signal is substantially invariant as the temperature of the fluid changes.

BRIEF DESCRIPTION OF THE DRAWINGS

Other objects and many of the attendant advantages of the invention will be readily appreciated as the same becomes better understood by reference to the following detailed description when considered in connection with the accompanying drawing wherein.

DESCRIPTION OF THE PREFERRED EMBODIMENTS

Figure 1:
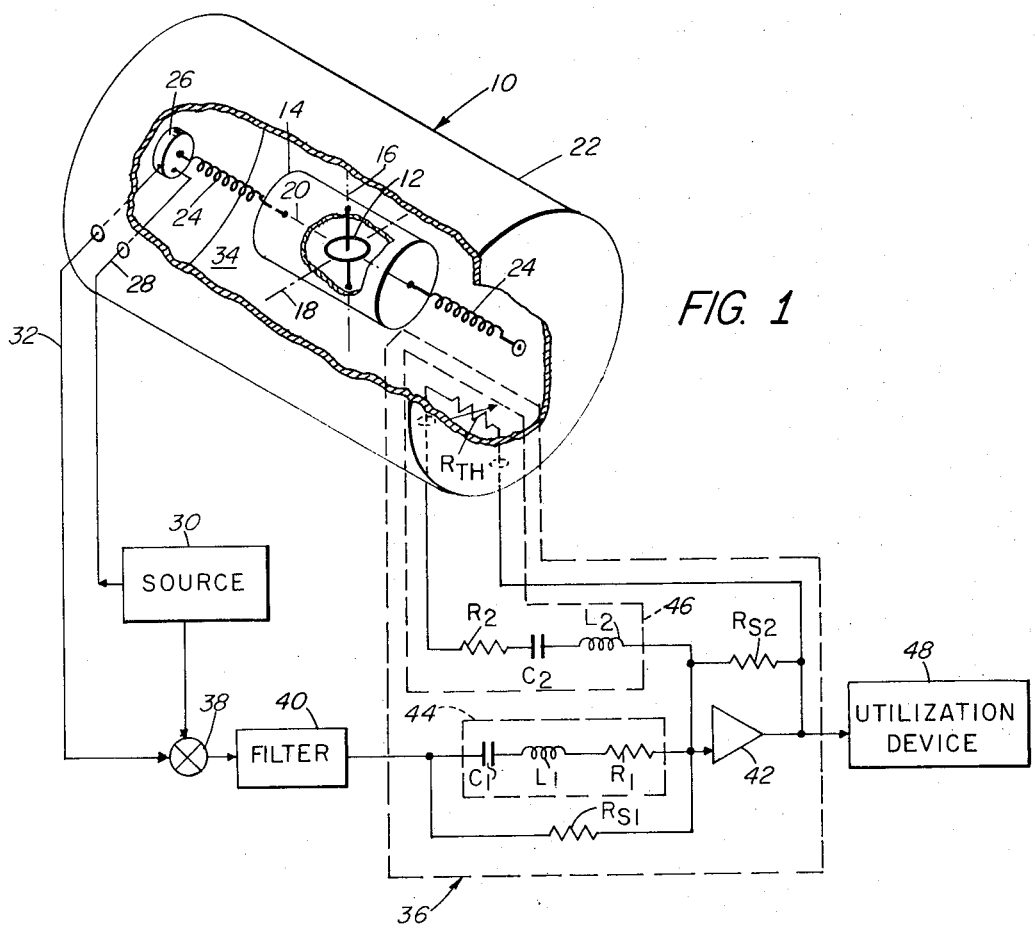
FIG. 1 shows rate sensing gyroscopic apparatus and a temperature compensating circuit employing the principle of the invention.

Referring now to FIG. 1, a rate sensing gyroscopic apparatus 10 is shown to include a rotor element 12, supported by a float 14 and adapted to rotate about axis 16 by conventional means (not shown). An angular rate, $\omega$, about input axis 18 causes a torque about output axis 20 and proportional to such rate to be applied to the float 14. The float 14 is restrained from rotation about output axis 20 by torsional springs 24. Such torsional springs 24 have one end affixed to float 14 and one end affixed to case 22 through a pickoff 26 as shown. As is known, the restraining torque developed by torsional springs 24 is proportional, in a steady state condition, to the angular rate, $\omega$. The amount of angular rotation of float 14 relative to case 22 is, therefore, proportional to the restraining torque. Such angular rotation is measured by the pickoff 26, here a variable reluctance pickoff described in U.S. Pat. No. 3,483,761, W. W. Houghton et al, issued December 16, 1969 and assigned to the same assignee as the present invention. Such pickoff 26 is a type of synchro having its primary winding (not shown) coupled to a suitable a-c source 30 via line 28. The secondary winding (not shown) of the pickoff 26 develops a signal on line 32 proportional to the relative angular rotation of the float 14 with respect to the case 22. As noted above, the level of the signal on line 32 is proportional, in a steady state condition to the angular rate, $\omega$. In order to reach a steady state condition within a reasonable time, a viscous damping fluid, as a silicone fluid, not shown, is introduced into cavity 34.

As is known, the transfer function of rate sensing gyroscopic apparatus 10 is of the form $A(S)/B(S)$ and here may be described as:

$$Z_{10}(S) = E_o(S)/\omega(S) = [K_p H/K]/[(J/K)S^2 + (C_D/K)S + 1] \quad (1)$$

where: $E_o$ (volts) is the level of the signal on line 32;

$\omega$ (radians/sec.) is the angular rate about input axis 18;

$K =$ (dyne-cm/radian) stiffness of torsional springs, 24;

$C_D =$ (dyne-cm-sec.) viscous damping coefficient of the viscous damping fluid in cavity 34;

$H =$ (dyne-cm-sec.) angular momentum of rotor element, 12

$S =$ (sec.$^{-1}$) Laplace operator $K_P =$ (volts/radian) gain of pickoff 26

$J =$ (dyne-cm-sec.$^2$) inertia of float 14 about output axis 20.

The dynamic response of the gyroscopic apparatus 10 may therefore be characterized as having a natural frequency $\omega_n = \sqrt{K/J}$ and a damping factor $\rho = [C_D/2K] [\sqrt{K/J}]$ It is immediately apparent that the damping factor is proportional to the damping coefficient, $C_D$, of the viscous damping fluid. As is known, the damping coefficient, $C_D$, varies with changes in the temperature of the viscous damping fluid. Consequently, the dynamic response characteristic (i.e. the damping factor $\rho$) of the rate sensing gyroscopic apparatus also varies with changes in temperature.

The temperature produced variations in the dynamic response characteristic of the rate sensing gryroscopic apparatus 10 are compensated by electronic circuitry, 36, in a manner now to be described. Thus, the signal on line 32 is mixed with the signal produced by the a-c source 30 in a mixer 38. The signal produced by such mixer is impressed on a low pass filter 40 so that only signals near the difference frequency signal are passed and high harmonics are rejected. The gain of low pass filter 40 is such that the signal at its output is equal to $E_o$ and, therefore, is proportional to the angular rate, $\omega$.

Included in electronic circuitry 36 is an operational amplifier 42. The operational amplifier 42 is coupled to the low pass filter 40 through a network 44 and a resistor $R_{S1}$. Such network includes a resistor, $R_1$, an inductor $L_1$ and a capacitor $C_1$. The impedance of network 44 may, therefore, be represented as:

$$Z_{44}(S) = R_1 + L_1 S + (1/C_1 S) \quad (2)$$

where S is the Laplace Operator.

The output of operational amplifier 42 is connected back to the input through a negative feedback network 46 and a resistor $R_{S2}$. Such network includes a resistor $R_2$, an inductor $L_2$, a capacitor $C_2$ and a thermistor $R_{TH}$. The thermistor $R_{TH}$ is disposed in cavity 34 and therefore is immersed in the viscous damping fluid. Therefore, the resistance of such thermistor varies with temperature changes of the viscous damping fluid. The impedance of network 46 may be represented as:

$$Z_{46}(S) = R_2 + R_{TH} + L_2 S + (1/C_2 S) \quad (3)$$

where S is the Laplace Operator. The transfer function of electronic circuitry 36 (neglecting $R_{S1}$ and $R_{S2}$) is of the form $C(S)/D(S)$ and here may therefore be represented as:

$$Z_{36}(S) = [1 + (R_2 + R_{TH}) C_2 S + L_2 C_2 S^2]/[1 + R_1 C_1 S + L_1 C_1 S^2] \quad (4)$$

Therefore, the transfer function of the combination of the rate sensing gyroscopic apparatus 10 and electronic circuitry 36 (i.e. the relationship between the signal at the output of operational amplifier 42 and the angular rate, $\omega$), $Z_T(S)$ may be represented (again neglecting $R_{S1}$ and $R_{S2}$) by:

$$Z_T(S) = ([K_P H/K]/[(J/K)S^2 + (C_D/K)S + 1]) ([1 + (R_{TH} + R_2)C_2 S + L_2 C_2 S^2]/[1 + R_1 C_1 S + L_1 C_1 S^2]) \quad (5)$$

A little thought will make it apparent that transfer function $Z_T(S)$ may be made invariant with temperature-produced viscosity changes in the viscous damping fluid by having the resistance of thermistor $R_{TH}$ vary with temperature changes according to the following relationship:

$$R_{TH} = (C_D/K)(1/C_2) - R_2 \text{ and also be having} \quad (6)$$

$$(J/K) = L_2 C_2 \quad (7)$$

To put it another way, the electrical characteristic of network 46 is made to vary with changes in the temperature of the viscous damping fluid so that an electrical analog of the change in characteristic of the rate sensing gyroscopic apparatus 10 is obtained. The electrical characteristic of network 44, being invariant with temperature change, is, therefore, an electrical analog of a "desired" rate sensing gyroscopic apparatus.

It is noted that resistors $R_{S1}$, $R_{S2}$ shunt networks 44, 46 as shown. Resistor $R_{S2}$ is necessary because without such resistor a d-c feedback path would not exist around operational amplifier 42. Without resistor $R_{S2}$ the operational amplifier 42 would therefore tend to saturate. Resistor $R_{S1}$ is added to essentially cancel the effect of resistor $R_{S1}$ from the transfer function $Z_T(S)$ and to properly couple through the operational amplifier 42 the steady state voltage appearing at its input. Such cancellation is possible if $R_{S1} = R_{S2} >> R_2 + R_{TH}$. Therefore, Eqs. (4) and (5) may be considered as representing the transfer functions of electronic circuitry 3G and the transfer function of the combination of the rate sensing apparatus 10 and electronic circuitry 36. The output of operational amplifier 42 is coupled to utilization device 48, here a properly scaled voltmeter, which now provides an indication of the angular rate $\omega$.

Figure 2:
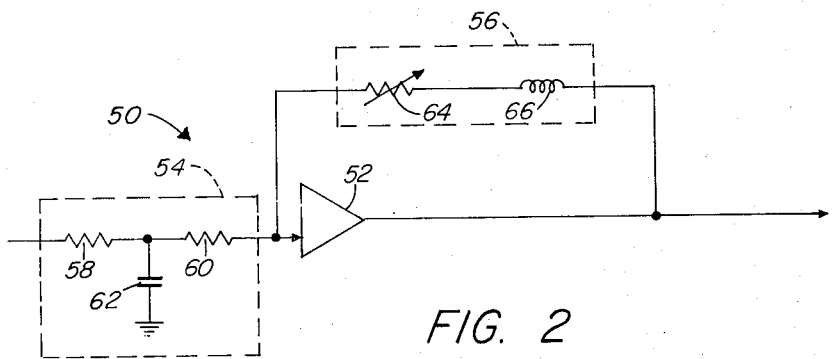
FIG. 2 shows a temperature compensating circuit employing the principles of the invention for use with integrating gyroscopic apparatus.

Referring now to FIG. 2, an electronic circuitry 50 is shown for compensating temperature produced variations in the viscosity of viscous damping fluid used in integrating gryroscopic apparatus (not shown). As is known, the transfer function $Z_T'(S)$ of such integrating gyroscopic apparatus is of the form $A(S)/B(S)$ and here may be expressed as:

$$Z'(S) = (K_P H)/(C_D S[(J/C_D)S + 1]) \quad (8)$$

Therefore, for reasons described above in reference to FIG. 1, the dynamic response (i.e. the time constant, $J/C_D$) of such apparatus will vary with temperature produced variations in the viscosity of the viscous damping fluid. Electronic circuitry 50 includes an operational amplifier 52. The operational amplifier has its input connected through a network 54 to a low pass filter (not shown) in a manner similar to that described in connection with FIG. 1. Network 54 includes a resistor 58, a resistor 60, and a capacitor 62. The output of such operational amplifier 52 is connected to its input through a conventional negative feedback network 56. Network 56 includes a thermistor 64 and an inductor 66. The thermistor 64 is suitably connected to the integrating gyroscopic apparatus so as to be responsive to the temperature of the viscous damping fluid in such apparatus. The impedance of network 54 may be represented as:

$$Z_{54}(S) = (1/(R_2 + R_3)\times[c_{(R2} + R_3)/R_2 R_3]CS + 1) \quad (9)$$

where $R_2$ = (ohms) resistance of resistor 58
$R_3$ = (ohms) resistance of resistor 60
$C$ = (farads) capacitance of capacitor 62
The impedance of network 56 may be represented as:

$$Z_{56}(S) = R_{TH}[(L/R_{TH})S + 1] \quad (10)$$

The transfer function of electronic circuitry 50 is of the form $(CS)/D(S)$ and here may be explained as $$Z_{50}(S) = (R_{TH}[(L/R_{TH})S + 1])/([(R_2 + R_3)(R_2R_3/R_2 + R_3)CS] + 1) \quad (11)$$

The transfer function of the combination of the integrating gyroscopic apparatus (not shown) an electronic circuitry 50 may therefore be represented by $$Z_T''(S) = ([K_P H]/[C_D S((J/C_D)S + 1)])$$
$$([R_{TH}((L/R_{TH})S + 1)]/[(R_2 + R_3)(R_2 R_3/R_2 + R_3) CS] + 1]) \quad (12)$$

A little thought will make it apparent that the time constant of the transfer function $Z_T''(S)$ and therefore the dynamic response characteristic of the signal at the output of operational amplifier 52 to an input rate may be made invariant with temperature produced changes in the viscosity of the viscous damping fluid. This is so because the resistance of the thermistor varies according to $$R_{TH} = [C_D/J] L \quad (13)$$

(that is, $R_{TH}$ must be substantially proportional to $C_D$).

While the invention has been described for temperature compensation of fluid damped gyroscopic apparatus, as will now be obvious to one of ordinary skill in the art, the invention may be implemented for use in other fluid damped measuring instruments such as fluid damped accelerometers. Further, the inductors and capacitors used in the temperature compensating circuitry may be replaced by active solid state circuitry which simulates the effect of the inductors and capacitors. Such active solid state circuitry is described in Electronic Products dated April 1970 published by United Technical Publications, Garden City, N.Y. and in Philbrick Research, Inc. Applications Manuel dated 1966 and published by Nimrod Press, Boston, Mass., Library of Congress Catalogue Card Member 66-19610.

It is felt, therefore, that this invention should not be restricted to the proposed embodiments, but rather should be limited only by the spirit and scope of the following claims.

What is claimed is:

1. Temperature compensating circuitry for use with a fluid damped measuring instrument incorporating a movable mass damped in accordance with the viscosity of the fluid, the viscosity of such fluid varying with changes in temperature, such instrument being adapted to produce an output signal in accordance with the motion of the mass, such output signal having a dynamic response characteristic related to the viscosity of the fluid, such circuitry comprising:
   a. a temperature sensitive element having an electrical characteristic variable in accordance with the temperature of the fluid; and
   b. electronic means, responsive to the electrical characteristic of the temperature sensitive element and the output signal, for modifying the output signal to render the dynamic response characteristic of such signal substantially invariant with the temperature of the fluid.

2. The temperature compensating circuitry recited in claim 1 wherein the electronic means includes: a first electronic network, the electrical characteristic of such network varying in accordance with the changes in temperature of the fluid; and, a second electronic network, the electrical characteristic of such second electronic network being invariant with the changes in temperature of the fluid.

3. The temperature compensating circuitry recited in claim 2 wherein the electronic means includes an operational amplifier, the input of such amplifier being coupled to the measuring instrument through the second electronic network and a portion of the output of the operational amplifier being fed back to the input of such amplifier through the first electronic network.

4. Temperature compensating circuitry for use with a fluid damped measuring instrument incorporating a movable mass, the motion thereof being related to an input variable and damped in accordance with the viscosity of the fluid, the viscosity of such fluid varying with changes in temperature, such instrument being adapted to produce an output signal in accordance with the motion of the mass, the output signal being related to the input variable through a transfer function of the form $A(S)/B(S)$ where $S$ is the Laplace operator and $B(S)$ is related to the viscosity of the fluid, such circuitry comprising:
   a. a temperature sensitive element having an electrical characteristic variable in accordance with the temperature of the fluid; and,
   b. electronic circuitry, responsive to the output signal and the electrical characteristic of the temperature sensitive element, for modifying the output signal in accordance with a transfer function of the form $C(S)/D(S)$ where $S$ is the Laplace operator and $C(S)$ is related to the electrical characteristics of the temperature sensitive element and is substantially proportional to $B(S)$ over the changes in temperature.

* * * * *